United States Patent
Case et al.

(10) Patent No.: US 12,056,894 B2
(45) Date of Patent: Aug. 6, 2024

(54) METHOD FOR IMAGING A REGION OF INTEREST OF A SAMPLE USING A TOMOGRAPHIC X-RAY MICROSCOPE, MICROSCOPE, SYSTEM AND COMPUTER PROGRAM

(71) Applicant: Carl Zeiss SMT Inc., Pleasanton, CA (US)

(72) Inventors: Thomas Anthony Case, Walnut Creek, CA (US); Susan Candell, Lafayette, CA (US); Naomi Kotwal, Dublin, CA (US); Allen Gu, Pleasanton, CA (US); Lorenz Lechner, San Ramon, CA (US); Wayne Broderick, Pleasanton, CA (US)

(73) Assignee: Carl Zeiss SMT, Inc., Dublin, CA (US)

( * ) Notice: Subject to any disclaimer, the term of this patent is extended or adjusted under 35 U.S.C. 154(b) by 332 days.

(21) Appl. No.: 17/470,695

(22) Filed: Sep. 9, 2021

(65) Prior Publication Data
US 2021/0407127 A1 Dec. 30, 2021

Related U.S. Application Data

(63) Continuation of application No. PCT/US2020/023494, filed on Mar. 19, 2020.
(Continued)

(30) Foreign Application Priority Data

Jul. 25, 2019 (DE) .......................... 102019120169.1

(51) Int. Cl.
*G06T 7/73* (2017.01)
*G21K 7/00* (2006.01)

(52) U.S. Cl.
CPC .................. *G06T 7/74* (2017.01); *G21K 7/00* (2013.01); *G06T 2207/10056* (2013.01); *G06T 2207/10116* (2013.01)

(58) Field of Classification Search
CPC . G06T 2207/10056; G06T 2207/30148; G06T 2207/10116; G06T 2207/10061;
(Continued)

(56) References Cited

U.S. PATENT DOCUMENTS 6,272,204 B1 * 8/2001 Amtower ............... G01N 23/04
378/98.3
6,539,106 B1 * 3/2003 Gallarda ............. G06V 10/987
382/286

(Continued)

FOREIGN PATENT DOCUMENTS

| CN | 102636963 A | 8/2012 |
| CN | 103065322 A | 4/2013 |

(Continued)

OTHER PUBLICATIONS

International Preliminary Report on Patentability for corresponding PCT Appl. No. PCT/US2020/023494, dated Sep. 30, 2021.
(Continued)

*Primary Examiner* — Dani Fox
*Assistant Examiner* — Soorena Kefayati
(74) *Attorney, Agent, or Firm* — Fish & Richardson P.C.

(57) ABSTRACT

A method images a region of interest of a sample using a tomographic X-ray microscope. The method includes registering a position of the sample. Registering includes: imaging a portion of the sample containing a feature using the microscope, identifying the feature by matching the feature to a pre-recorded feature, and determining a relative position of the feature in relation to the pre-recorded feature. The method also includes navigating a field of view of the (Continued)

microscope over the region of interest based on the registered position of the sample, and imaging the region of interest using the microscope.

23 Claims, 5 Drawing Sheets

Related U.S. Application Data

(60) Provisional application No. 62/820,989, filed on Mar. 20, 2019.

(58) Field of Classification Search
CPC ... G06T 7/74; G06T 7/73; G21K 7/00; G01N 23/04; G01N 23/083; G01N 23/044; G01N 23/223; G01N 23/225; G01N 2223/419; G01N 2223/076; G01N 2223/611; G01N 2223/6113; G01N 2223/6116; G01N 2223/643
See application file for complete search history.

(56) References Cited

U.S. PATENT DOCUMENTS

| | | | |
|---|---|---|---|
| 2001/0019109 A1* | 9/2001 | Yamaguchi | H01J 37/222 250/311 |
| 2001/0053245 A1* | 12/2001 | Sakai | G06T 7/32 382/218 |
| 2005/0225632 A1* | 10/2005 | Iffland | G01N 21/956 348/87 |
| 2006/0045325 A1* | 3/2006 | Zavadsky | G06T 7/74 382/209 |
| 2008/0159475 A1* | 7/2008 | Mazor | G01N 23/223 378/50 |
| 2010/0063619 A1* | 3/2010 | Tsai | G01N 21/956 700/275 |
| 2011/0002528 A1* | 1/2011 | Bajura | G06T 7/001 382/145 |
| 2011/0194101 A1* | 8/2011 | Tachizaki | G01N 23/2251 356/72 |
| 2011/0262043 A1* | 10/2011 | Sato | G06V 20/69 382/209 |
| 2012/0206703 A1* | 8/2012 | Bhattacharyya | G03F 7/70625 356/612 |
| 2014/0037052 A1* | 2/2014 | Adler | H01L 27/0203 378/43 |
| 2014/0064445 A1* | 3/2014 | Adler | G01N 23/083 378/43 |
| 2014/0198975 A1* | 7/2014 | Nakagaki | G01N 21/9501 382/149 |
| 2015/0078518 A1* | 3/2015 | Tziazas | G06T 7/001 378/53 |
| 2015/0139531 A1* | 5/2015 | Hirai | H01L 22/12 382/149 |
| 2016/0356598 A1* | 12/2016 | Toyoda | G01N 23/203 |
| 2018/0113083 A1* | 4/2018 | Van Dael | G01N 23/046 |
| 2019/0206652 A1* | 7/2019 | Akinwande | G01N 23/041 |
| 2020/0134824 A1* | 4/2020 | Adiga | G06T 7/0004 |
| 2020/0302584 A1* | 9/2020 | Zhang | G06F 18/214 |

FOREIGN PATENT DOCUMENTS

| | | |
|---|---|---|
| DE | 10260883 B3 | 7/2004 |
| EP | 3021280 A1 | 5/2016 |
| JP | 2002198097 A | 7/2002 |
| TW | 200846656 A | 12/2008 |
| TW | 201821789 A | 6/2018 |
| TW | 201907155 A | 2/2019 |
| WO | WO 2017160829 A1 | 9/2017 |
| WO | WO 2018053199 A1 | 3/2018 |
| WO | WO 2018209134 A1 | 11/2018 |

OTHER PUBLICATIONS

International Search Report and Written Opinion for corresponding PCT Appl. No. PCT/US2020/023494, dated Jul. 1, 2020.

Toda Hiroyuki et al: "Grain boundary tracking: A four-dimensional visualization technique for determining grain boundary geometry via local strain mapping", Acta Materialia, Elsevier, Oxford, GB, vol. 61, No. 14, Jun. 27, 2013 (Jun. 27, 2013), pp. 5535-5548, XP028595695.

Sylvester Yuri et al: "30 X-ray microscopy: A near-SEM nondestructive imaging technology used in the development of 30 IC packaging", 2013 IEEE International 30 Systems Integration Conference (3DIC), IEEE, Oct. 2, 2013 (Oct. 2, 2013), pp. 1-7, XP032541614.

* cited by examiner

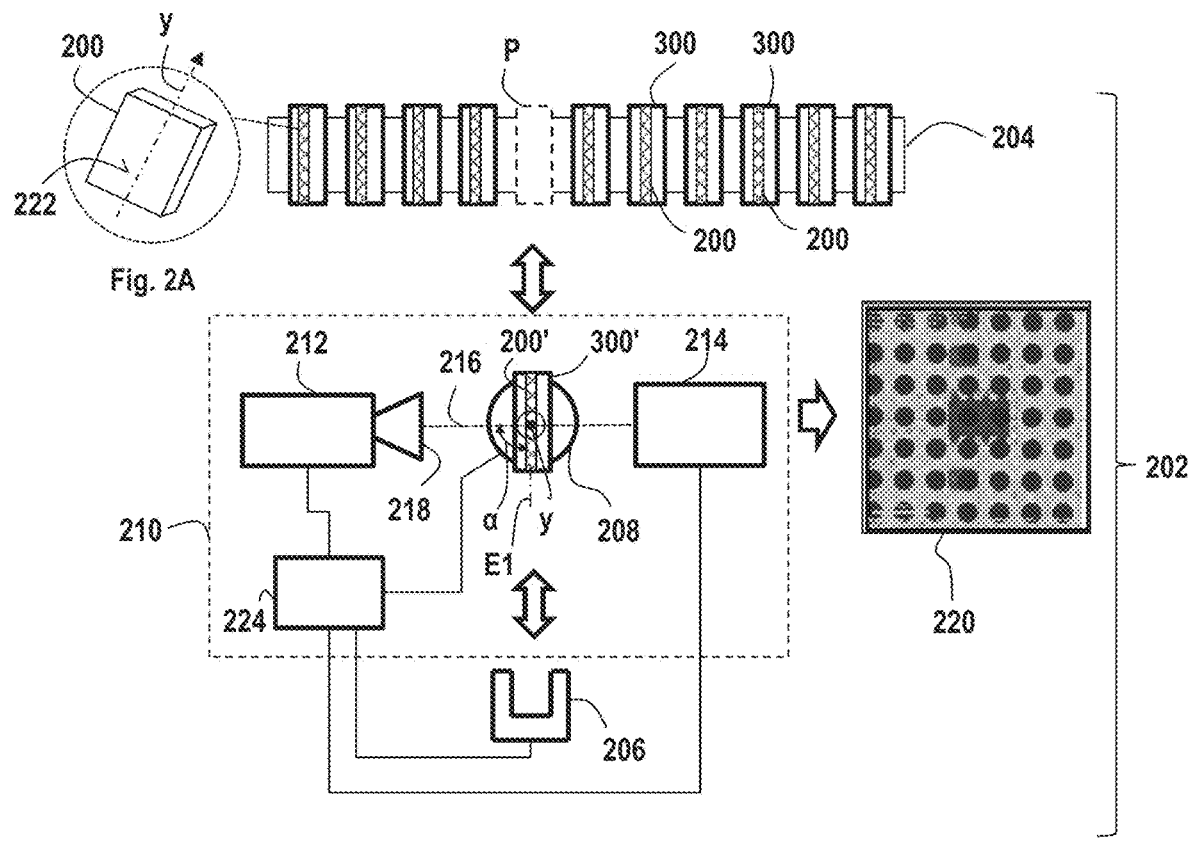
Fig. 2A
Fig. 2
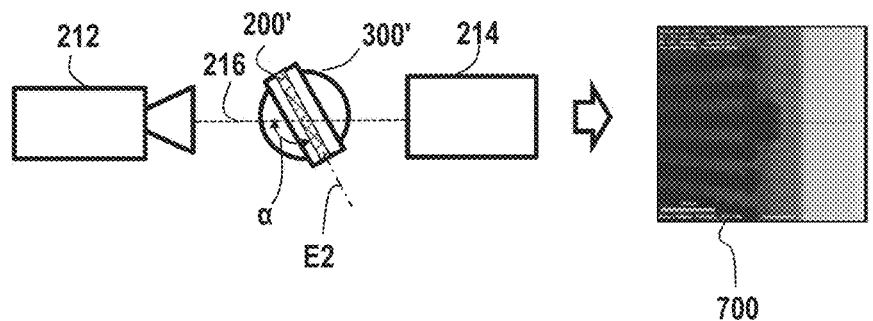
Fig. 7

METHOD FOR IMAGING A REGION OF INTEREST OF A SAMPLE USING A TOMOGRAPHIC X-RAY MICROSCOPE, MICROSCOPE, SYSTEM AND COMPUTER PROGRAM

CROSS-REFERENCE TO RELATED APPLICATIONS

The present application is a continuation of, and claims benefit under 35 USC 120 to, international application PCT/US2020/023494, filed Mar. 19, 2020, which claims benefit under 35 USC 119 of German Application No. 10 2019 120 169.1, filed Jul. 25, 2019 and U.S. Ser. No. 62/820,989, filed Mar. 20, 2019. The entire disclosure of these applications are incorporated by reference herein.

FIELD

The present disclosure relates to a method for imaging a region of interest of a sample using a tomographic X-ray microscope, as well as a related microscope, a related system and a related computer program.

BACKGROUND

3D X-ray imaging techniques such as X-ray microscopy (XRM) and microCT have become established failure analysis (FA) tools for bridging fault isolation and physical failure analysis (PFA), because they can enable the visualization of defects without having to destroy the device under test. Furthermore, these tools can provide FA analysts with better information for determining the best approach to conduct PFA for root cause analysis. The XRM advantages of non-destructive, high-resolution imaging can make it an excellent option for routine inspection of semiconductor package features such as traces, C4 bumps, and microbumps. MicroCT is also valuable, although its resolution when applied to larger sample geometries is typically lower than the resolution that can be achieved with XRM. Since XRM and microCT share significant similarities, the terms will be used interchangeably in the rest of the document.

XRM set-up and acquisition times have limited its proliferation and adoption beyond FA and manual measurement applications. XRM workflow improvements offer the opportunity to realize the efficiency and throughput benefits of automated device handling for productivity in high-resolution, site-specific inspection and measurement applications.

Workflow acceleration and automation can become particularly desirable in situations where, for example, multiple semiconductor packages are checked for a certain type of defect in the same predefined region of interest (ROI). This may be the case when a manufacturer of semiconductor packages encounters recurring failures of the same feature, for example a specific micro bump, in a certain type of semiconductor package.

Generally, in conventional FA, an operator places every semiconductor package in a sample holder and moves the sample so the microscope's field of view is directed to the position where he or she expects the ROI to be. However, typical semiconductor packages are, for example, 15×10 mm whereas the field of view of the microscope is in the order of 1×1 mm or smaller. Since every semiconductor package is usually different in terms of dimensions and, when mounted on the sample holder, may assume a different position due to mounting tolerances, and even sample holders of varying tolerance may be used for different semiconductor packages, oftentimes the operator will miss the actual ROI. Yet, the operator usually will only realize that he or she missed after completion of imaging and analyzing the (wrong) ROI for the expected physical failure. Imaging alone may take 30 minutes or more.

SUMMARY

The present disclosure seeks to provide an improved method for imaging a region of interest of a sample using a microscope.

The disclosure provides a method for imaging a region of interest of a sample using a tomographic X-ray microscope is provided. The method includes:
registering a position of the sample, the step of registering including:
imaging a portion of the sample containing a feature using the microscope,
identifying the feature by matching the feature to a pre-recorded feature, and
determining a relative position of the feature in relation to the pre-recorded feature,
navigating a field of view of the microscope over the region of interest based on the registered position, and
imaging the region of interest using the microscope.

By way of this method, XRM set-up and acquisition times can be reduced and automated sample inspection becomes viable. The reason is that by registering the position of the sample in relation to a baseline sample (the sample having the pre-recorded feature and is also termed "first sample" herein), sample-to-sample-, sample holder-to-sample- and holder-to-holder-variations (sometimes also termed "tolerances") can be accounted for. In turn, the step of navigating can be simplified since during the step of navigating (substantially) the same navigation path can be used as for the baseline sample. Merely, the navigation is desirably adapted depending on the registered position of the sample in order to find the desired region of interest (ROI).

Thus, the same "recipe" can be used when inspecting a number, for example, 5, 10, 20 or more samples without the need for human intervention. The microscope is only trained on a first sample having the pre-recorded feature as well as the ROI. The second and following samples can be inspected automatically.

Optionally, during the step of registering, the position of the sample in two dimensions (2D) or three dimensions (3D) is registered. "Register" herein means to determine and, as the case may be, to record the position of the sample. The registered position may be derived, for example calculated, from the first sample's position and the determined relative position, for example by way of vector operations (addition and/or subtraction).

"Imaging" herein may include a scanning operation of the microscope. "Imaging" herein refers to creating a 2D or 3D digital image of at least a portion of the sample. When using tomographic X-ray microscopy, the initial image is always 2D (corresponding to a section through the sample). Yet, using mathematical methods, a 3D digital image can be calculated from a number of 2D images taken from different angles with regard to the sample.

The field of view of the microscope is the largest portion of the sample which can be imaged using the microscope while maintaining image distortions below a predefined threshold. However, the microscope may be configured so as to allow changing the field of view including, for example, a first setting in which the field of view is large and the corresponding resolution is low and a second setting in which the field of view is small and the corresponding resolution is high.

During the step of navigating the field of view of the microscope over the region of interest based on the registered position, either the microscope can be moved relative to the sample, or the sample is moved relative to the microscope.

The features can be, for example, structures intentionally produced by a manufacturing method (for example microbumps, corners or traces), unintentionally produced defects or irregularities on or in the sample which are visible, detectable or discernible in recorded images of the sample (or portion of the sample) such that there is a one-to-one correspondence between the sample feature and the pre-recorded feature. The feature can also be termed "landmark" and the pre-recorded feature "pre-recorded landmark".

The step of matching the feature to a pre-recorded feature includes comparing the feature and the pre-recorded feature to each other and, as the case may be, calculating a value representing the similarity of the feature and the pre-recorded feature.

In embodiments, the steps of registering, navigating and imaging are automated, i.e. they are executed without human intervention.

According to an embodiment, the step of registering includes:
  imaging a first portion of the sample containing a first feature using the microscope,
  identifying the first feature by matching the first feature to a pre-recorded first feature,
  determining a relative position of the first feature in relation to the pre-recorded first feature,
  imaging a second portion of the sample containing a second feature using the microscope,
  identifying the second feature by matching the second feature to a pre-recorded second feature, and
  determining a relative position of the second feature in relation to the pre-recorded second feature,
  wherein, optionally, the first and second portion lie in planes intersecting each other.

By using, for example, a first and a second feature as described above, the position of the sample can be easily determined in three dimensions. The first and the second feature may be identical structures of the sample, yet seen under a different angle by the microscope.

According to an embodiment, the step of registering includes:
  imaging a portion of the sample containing a first feature using the microscope,
  identifying the first feature by matching the first feature to a pre-recorded first feature,
  determining a relative position of the first feature in relation to the pre-recorded first feature,
  imaging the same portion of the sample containing a second feature using the microscope,
  identifying the second feature by matching the second feature to a pre-recorded second feature, and
  determining a relative position of the second feature in relation to the pre-recorded second feature, The first and second features can lie in the same portion of the sample. For example, a single image is taken containing a (sufficient) plurality of features (for example the first and second feature), and registering these features to prerecorded features (for example prerecorded first and second feature) gives the 3D coordinates for navigation. In this case, the microscope is calibrated sufficiently such that the distance between features specifies the distance to the sample precisely for 3D navigation.

According to an embodiment, the sample is rotated between imaging the first and second portion by a predetermined angle.

By rotating the sample, the first and second portions can be easily imaged such that corresponding planes of the first and second portion intersect each other. The predetermined angle may be used in determining the relative position of the feature and pre-recorded feature, and thus in registering the position of the sample.

According to an embodiment, the pre-recorded feature is selected from a portion of a first sample. Optionally, the pre-recorded feature is selected from a plurality of features from the portion using a scoring method.

According to an embodiment, the scoring method includes comparing, amongst the plurality of features, each feature to a respective other feature.

In addition, the scoring method may include calculating a score representing a dissimilarity (or uniqueness) of the feature as compared to the respective other features.

According to an embodiment, selecting the pre-recorded feature from the plurality of features involves displaying at least two or more features from the plurality of features exceeding a score threshold to an operator, wherein the operator selects one of the at least two or more features as the pre-recorded feature.

According to an embodiment, the pre-recorded feature is selected from a portion of a first sample, and the steps of registering, navigating and imaging are performed for N samples, where N is larger than 1.

For example, N is larger than 5, 10 or 20. For example, the steps of registering, navigating and imaging are performed for the second sample and repeated thereafter for each consecutive sample.

According to an embodiment, the microscope includes an X-ray source, a sample stage including the sample, and an X-ray detector arranged, in relation to the X-ray source, behind the sample.

The X-ray source can send out an X-ray beam which passes through the sample and is detected by the X-ray detector. The X-ray detector may include a scintillator and/or a charge-coupled device (CCD)-camera detecting light sent out from the scintillator when irradiated with the X-ray beam (after passing through the sample).

The X-ray source and the X-ray detector may be provided fixedly whereas the sample stage may be provided movably in relation to the X-ray source and the X-ray detector. By moving the sample stage, the X-ray beam scans over the sample. Corresponding images of portions of the sample are detected by the X-ray detector. For example, it may be provided that the sample stage may be moved in the vertical direction and rotated about the vertical direction. To this end, one or more electric motors may be provided. The sample stage may include a sample holder holding the sample.

According to an embodiment, the sample stage includes a sample holder holding the sample during the steps of registering, navigating and imaging.

According to an embodiment, the portion including the feature is, initially, imaged at a low resolution, and a smaller portion, including the feature, within the portion is imaged at at least at one higher resolution.

When using a high-resolution image, the sample's position can be registered with greater accuracy. At the same time, the feature can be easily found using an image at low resolution.

According to an embodiment, the sample is an integrated circuit package.

According to an embodiment, it is provided that the sample is retrieved from a conveyer and placed within the microscope, the steps of registering, navigating and imaging are performed, and the sample is removed from the microscope and placed back onto the conveyer.

This can allow for easy fully automated fault analysis.

According to an aspect, there is provided a tomographic X-ray microscope, including:
- an imaging unit for imaging a portion of a sample containing a feature, and for imaging a region of interest of the sample,
- a registering unit for registering a position of the sample, the registering unit including:
  - an identifying unit for identifying the feature by matching the feature to a pre-recorded feature, and
  - a determining unit for determining a relative position of the feature in relation to the pre-recorded feature,
- a navigating unit for navigating a field of view of the microscope over the region of interest based on the registered position of the sample.

The imaging unit may include the X-ray source and the X-ray detector. The navigating unit may include the sample stage, motors for moving the sample stage as well as a controller for controlling the motors to move the sample stage.

A respective unit, e.g. the registering, identifying and/or determining unit, may be implemented, at least partially, in hardware and/or in software. If the unit is implemented in hardware, it may be embodied as a device, e.g. as a computer or as a processor or as a part of a system, e.g. a computer system. If the unit is implemented in software it may be embodied as a computer program, as a function, as a routine, as a program code or as an executable object.

According to an aspect, there is provided a tomographic X-ray microscope as previously described, a first device providing a plurality of samples, and a second device configured to load at least one sample of the plurality of samples into the microscope.

The first device may be formed as a conveyer or magazine, the second device as a gripper, for example. The second device may be configured to load at least two or three samples into the microscope at the same time.

According to an aspect, there is provided a computer program to control, when executed, a tomographic X-ray microscope to carry out the method as previously described.

A computer program may be embodied as a memory card, USB stick, CD-ROM, DVD or as a file which may be downloaded from a server in a network. For example, such a file may be provided by transferring the file including the computer program from a wireless communication network.

The embodiments and features described with reference to the method of the present disclosure apply mutatis mutandis to the microscope, system and the computer program of the present disclosure.

Further possible implementations or alternative solutions of the disclosure also encompass combinations—that are not explicitly mentioned herein—of features described above or below with regard to the embodiments. The person skilled in the art may also add individual or isolated aspects and features to the most basic form of the disclosure.

BRIEF DESCRIPTION OF THE DRAWINGS

Further embodiments, features and aspects of the present disclosure will become apparent from the subsequent description and dependent claims, taken in conjunction with the accompanying drawings, in which:

FIG. 2 shows a system according to an embodiment in a top view;

FIG. 2A shows an integrated circuit package in a perspective view;

FIG. 7 shows components from FIG. 2, where a sample has been rotated.

DESCRIPTION OF EXEMPLARY EMBODIMENTS

Figure 1:
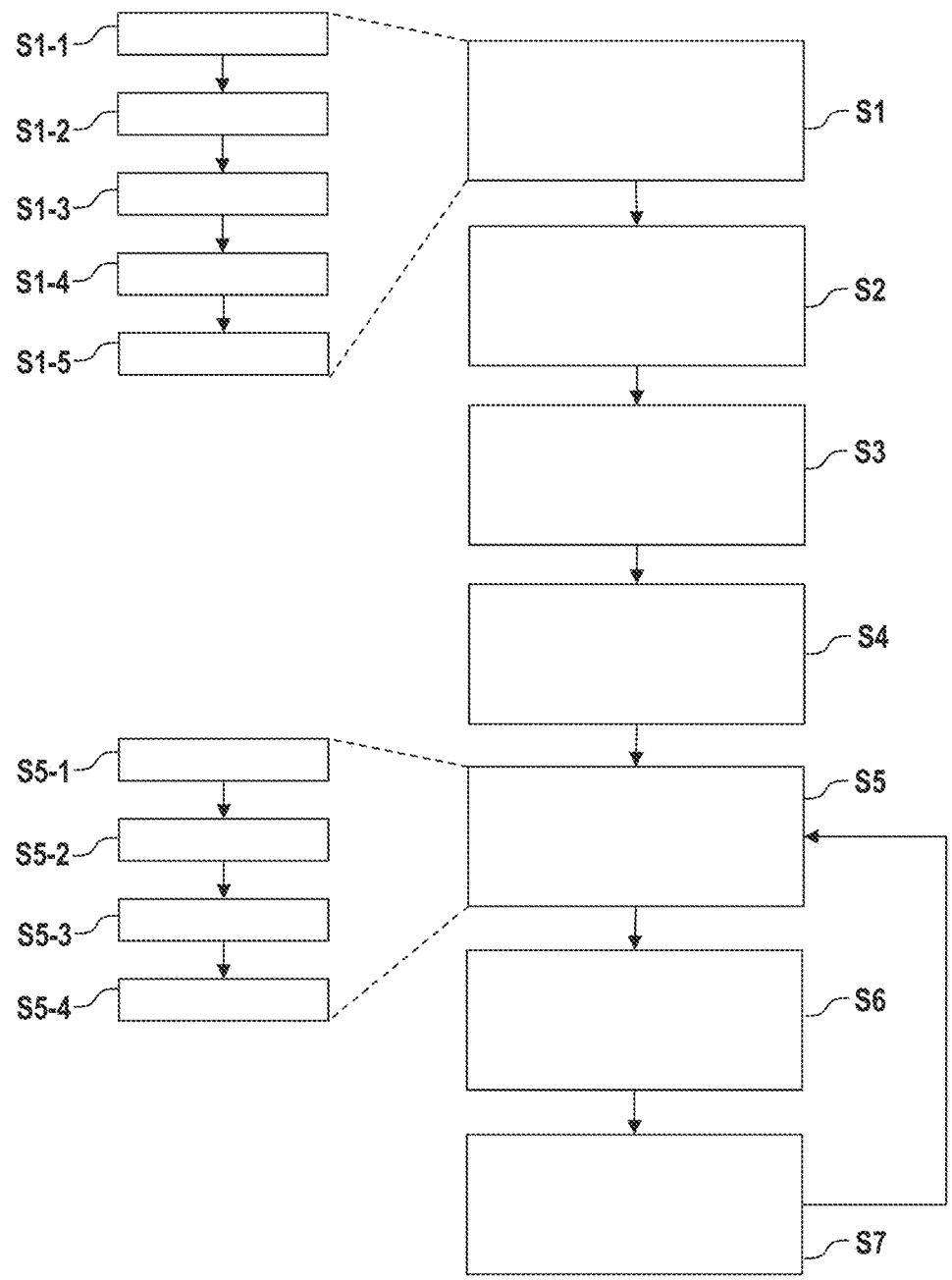
FIG. 1 shows a flowchart of a method according to an embodiment.

In the Figures, like reference numerals designate like or functionally equivalent elements, unless otherwise indicated.

FIG. 1 shows a flowchart of a method according to an embodiment.

In steps S1 and S2, a first and second feature are selected from a portion of a first (baseline) sample. The features will be used in step S5 to register a position of a second sample. Including step S2 (and S3) is optional.

The first and second sample as well as further samples mentioned hereinafter may be formed as an integrated circuit (IC) packages, for example flip chip package. One such IC package is illustrated in a perspective view in FIG. 2A and designated with reference numeral 200.

FIG. 2 shows a system 202 illustrating more IC packages 200 in a top view. They are each held in a sample holder 300 shown schematically in FIG. 2 and in more detail in FIGS. 3 and 4.

Figure 3:
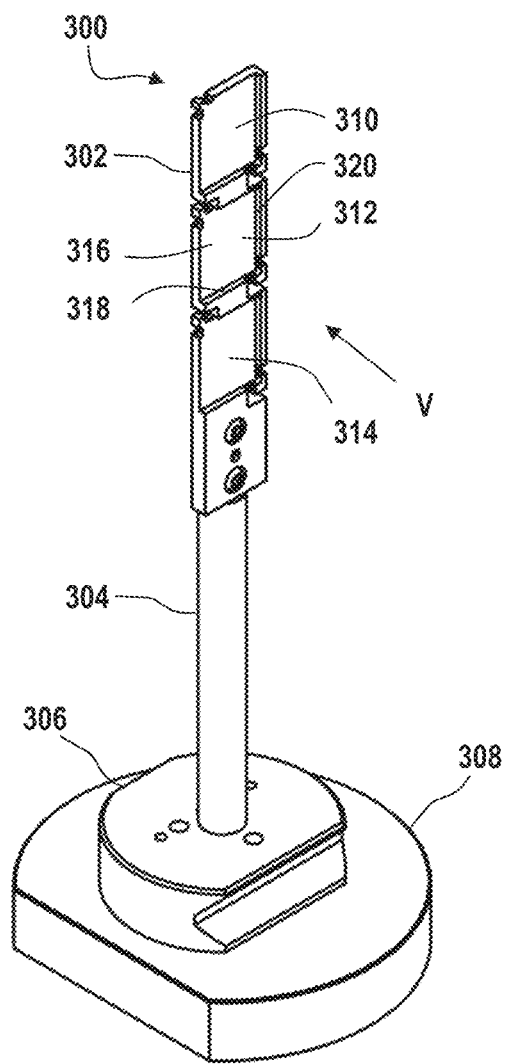
FIG. 3 shows a sample holder according to an embodiment in a perspective view.

The sample holder 300 includes a sample receptacle 302 (see FIG. 3). The sample receptacle 302 is made of a material that allows X-ray radiation to readily pass through. For example, the sample receptacle 302 may be formed from a polymeric material such as plastic. The sample receptacle 302 is fixed to a post 304. The post 304 is attached to a gripper disc 306 which is in turn fastened to a base plate 308.

Figure 4:
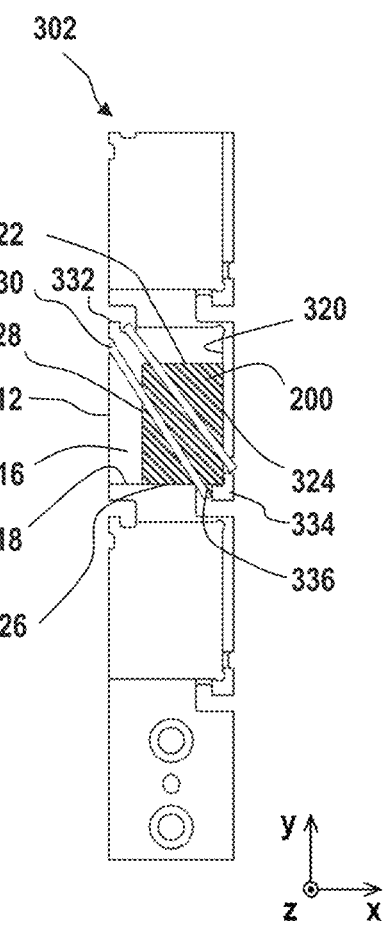
FIG. 4 shows, in a view V from FIG. 3, a sample receptacle.

The sample holder 300 may include one or more sample receiving sections each of which is configured to receive a sample 200. In the example, three sample receiving sections 310, 312, 314 are provided. FIG. 4 shows the sample receptacle 302 in a plan view V from FIG. 3. A sample 200 is shown to be held in the sample receiving section 312.

By way of example, the sample receiving section 312 will be explained in more detail hereinafter, yet the same applies to the sample receiving sections 310 and 314. The sample receiving section 312 is generally plate shaped and has a sample placement surface 316. In use of the sample holder 300, the sample placement surface 316 is oriented vertically. The sample 200 is placed on the sample placement surface 316. The sample receiving section 312 has a vertical alignment portion 318 and a horizontal alignment portion 320, the alignment portions being formed as ledges respectively. The alignment portions 318, 320 are arranged perpendicularly to each other.

The sample 200 may have a rectangular shape including four lateral edges 322, 324, 326, 328 (defining the sample's length and width). The thickness of the sample 200 may be small compared to its length and width. When placing the sample 200 on the sample placement surface 216, two of the edges 324, 326 of the sample 200 are guided along the alignment portions 318, 320 till the sample 200 is positioned in a bottom right corner (see FIG. 4) of the sample receiving section 214. Hence, the sample placement surface 216 aligns the sample 200 in the z-direction (corresponding to the sample's thickness), the vertical alignment portion 318 aligns the sample 200 in the y-direction (vertical direction) and the horizontal alignment portion 320 aligns the sample 200 in the x-direction (x- and z-directions are both horizontal directions orthogonal to each other).

A fixing element 330 fixes the sample 200 to the receptacle receiving section 314 in a non-permanent way. The fixing element 330 can be an O-ring spanning diagonally over the sample 200 and attached to opposite corners 332, 334 of the receptacle receiving section 314 via notches 336. The fixing element 330 is made of a flexible and radiation-stable material. For example, the fixing element 400 can be made of ethylene propylene diene methylene rubber (EPDM). The fixing element 400 imparts a securing force to mate the sample 200 against the sample placement surface 216 and the alignment portions 318, 320.

Returning to FIG. 2, it is shown that, for example, more than 10 sample holders 300 are arranged on a conveyer 204. The conveyer 204 delivers the sample holders 300 to a take-up position P. A gripper 206 loads one sample holder 300' onto a sample stage 208 of a tomographic X-ray microscope 210.

The microscope 210 includes an X-ray source 212, an X-ray detector 214, the sample stage 208 and a controller 224. The X-ray source 212 sends out an X-ray beam 216 incident on the sample 200' currently held in the field of view 218 of the X-ray source 212 by way of the sample holder 300'. The X-ray beam 216 passes through the sample 200' as well as through parts of the sample holder 300' (for example through the sample placement surface 216) and is received by the X-ray detector 214. The X-ray detector 214 generates an image 220 which represents, for example, a 2D-section through the sample 200'.

In FIG. 2, the sample stage 208 holds the sample 200' in a first rotational position around the y-axis, see also FIGS. 2A and 4. For example, this first rotational position corresponds to a position of the sample 200' in which one of the two major faces of the sample 200' (one such face is designated 222 in FIG. 2A) is oriented at (substantially) right angles, i.e. $\alpha=90°$, with respect to the X-ray beam 216 (i.e. its centerline).

After generating the image 220 (step S1-1 in FIG. 1), a feature (also termed "first feature" herein) is identified is identified in a portion of the sample which is to serve as a spatial reference (also termed "pre-recorded feature" herein) as explained in more detail hereinafter. To this end, the image 220 is analyzed (step S1-2 in FIG. 1) using a scoring method, for example. For example, the step of analyzing and scoring can be carried out on the controller 224 which may include a microprocessor and associated memory. The controller 224 reads the image 220 from the X-ray detector 214 and identifies a number of features. These features may include structures intentionally produced by a manufacturing method (for example micro-bumps, corners or traces) or unintentionally produced defects or irregularities on the sample 200'. The identified features are compared to each other and, optionally, a value is calculated which represents the uniqueness of each feature. If the value (score) lies above (or below depending on the criterion) a certain threshold, the corresponding feature is displayed to an operator on a screen 500 (corresponding to a step S1-3 in FIG. 1) as shown in FIG. 5.

Figure 5:
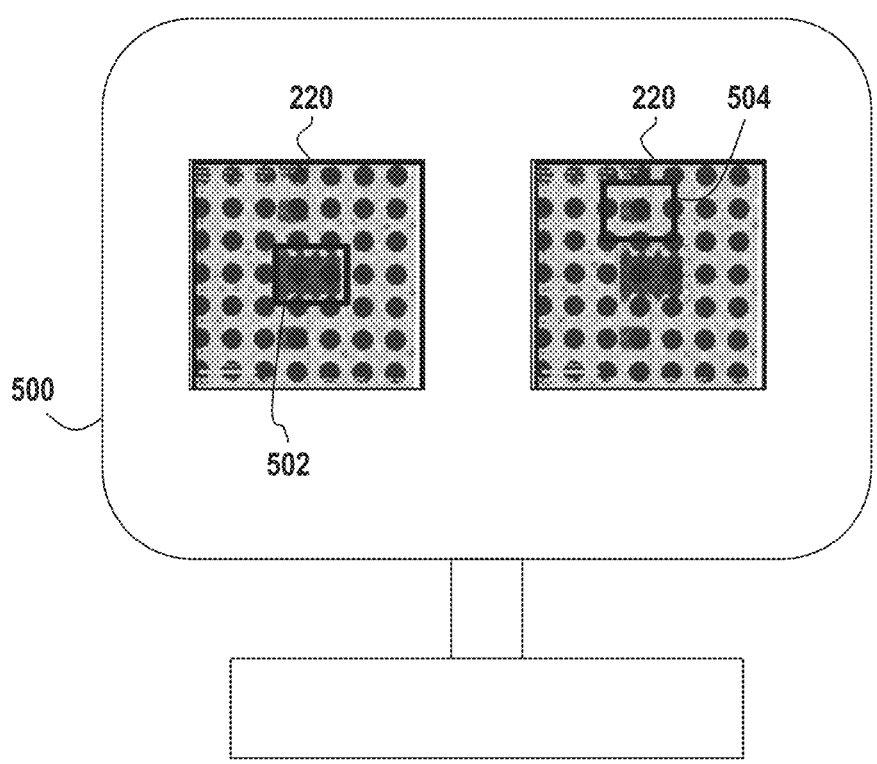
FIG. 5 shows a screen displaying images of a sample.

In the example of FIG. 5, two features 502, 504 have been identified in the image 220 which exceed the defined threshold. Now, an operator selects in step S1-4 (see FIG. 1), based on experience, one of the two features 502, 504 to serve as the spatial reference. The selected feature, in this case the feature 502, is saved on memory of the controller 224 (step S1-5). This data also includes the location of the feature 502 in relation to the origin O (see FIG. 6) of the kinematics of the sample stage 208. The kinematics include, for example, the electric motors, bearings and dampers of the sample stage 208. For example, the X-ray source 212 and the X-ray detector 214 are arranged fixedly (non-movably) with respect to the origin O. The location of the feature 502 in relation to the origin O can be expressed by a vector j (also termed "location vector" herein).

Now, returning to FIG. 2, the sample stage 208 including the sample holder 300' and the sample 200' is rotated, for example by way of an electric motor, into a second rotational position. In the second rotational position, $\alpha=125°$ for example, as illustrated in FIG. 7 which only shows some of the components of FIG. 2. Any other suitable angle $\alpha$ can be used as the first and second rotational position.

Hereinafter, another feature (also termed "second feature" herein) is identified in an image 700 taken from the sample 200' at its second rotational position (step S2 in FIG. 1). Due to the rotation, the first and second feature are contained in portions of the sample 200' lying in different planes E1, E2 which intersect each other. The steps S1-1 to S1-5 are repeated accordingly for the image 700. Thus, the second feature including its location vector is obtained and saved to the memory of the controller 224. The first and second feature may as such describe the same structure (which is assumed to be the case for reasons of simplification hereinafter without limiting the present disclosure), yet viewed at a different angle (compare images 220 and 700).

The location vectors (2D) of the first and second feature are combined in step S3 to obtain a vector (designated also "j" in FIG. 6 for the combined vector for simplification purposes) defining the location of the feature 502 in 3D with respect to the origin O. This process of combining may take into account the angle of rotation a.

Figure 6:
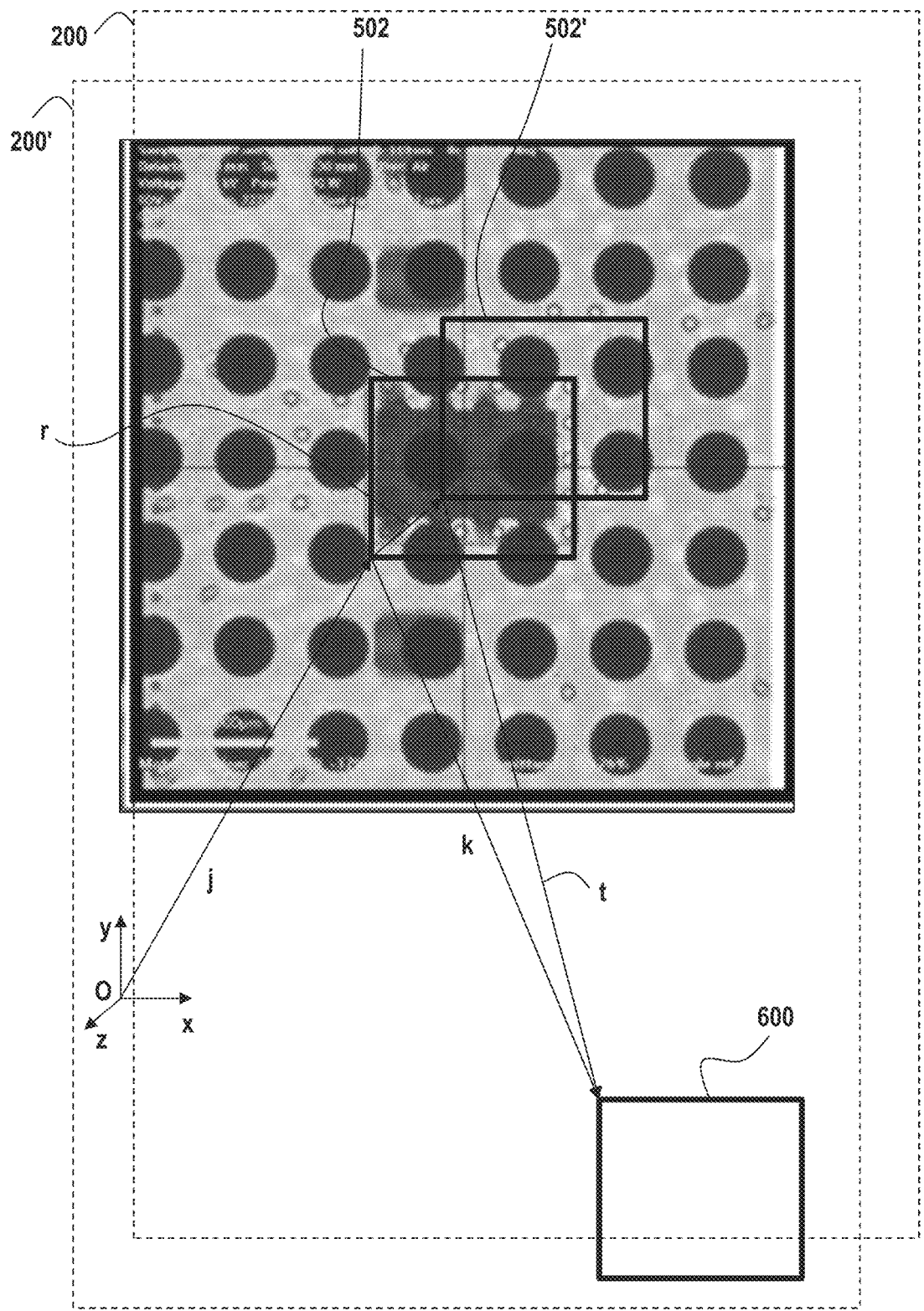
FIG. 6 shows a coordinate system within the system of FIG. 2.

Next, the field of view 218 of the microscope 210 is directed towards a region of interest 600 in FIG. 6 (step S4). This is done, for example, by moving the sample 200' relative to the field of view 218. According to the embodiment, the sample stage 208 is configured to move, over and above producing the rotation of the sample 200' about the y-axis, the sample holder including the sample 200 along the y-axis (upwards and downwards), for example by way of an electric linear motor. In this way, the field of view 218 can scan over the sample 200' in the vertical direction. By rotating the sample 200 about the y-axis sequentially or simultaneously, the entire sample 200' can be scanned, i.e. any portion including a region of interest can be analyzed. The region of interest 600 may, for example, include a suspected physical defect, for example a defective micro bump. The reason of interest 600 is, typically, the same for all samples 200 when the samples 200 correspond to a certain type of device, for example a certain type of IC chip. In one example, the chip manufacturer will let the operator know where to look for the defect which corresponds to the region of interest 600.

Once the operator has found the region of interest 600 (typically manually), the path the field of view 218 takes in relation to the feature 502 is determined in 3D and for example saved as a vector k on the memory of the controller 224.

Now, the second and consecutive samples 200 waiting on the conveyor 204 may be analyzed in an easy and fully automated fashion, for example, by applying the method steps explained in the following.

First, the second sample 200 (explanations in the following equally referring to consecutive samples) is taken off the conveyor 204 using the gripper 206 and placed on the sample stage 208 in its sample holder 300.

Then, the position of the second sample 200' in 3D (three dimensions x, y, z) in relation to the origin O (see FIG. 6) is registered in step S5. To this end, images 220 and 700 are taken of respective portions of the second sample 200 generated as described previously in relation to the first sample 200' (step S5-1 in FIG. 1).

In step S5-2, the first and second feature 502' (see FIG. 6—again only one reference numeral is given for reasons of simplification) are identified in the images 220 and 700 and matched to the pre-recorded features 502 (see FIG. 5) using the controller 224. The step of matching the features 502' to the pre-recorded features 502 includes comparing the features 502' and the pre-recorded features 502 to each other and calculating values representing similarity. When the calculated values exceeds a certain threshold respectively, the controller 224 decides that matching has been successful (otherwise the routine cannot continue). Optionally, a portion of the sample 200 including the first and second feature 502' is, initially, imaged at a low resolution, and a smaller portion, including the features, within the portion is imaged at at least at one higher resolution.

In step 5-3, the controller 224 determines the relative position of the first and second feature 502' of the second sample 200 in relation to the first and second feature 502 of the first sample 200', optionally, by calculating a vector r (see FIG. 6).

Since the vector k has been previously determined, the path along which the field of view 218 is navigated in order to reach the region of interest 600 can be calculated as:

$$t = k - r.$$

In step S6, the controller 224 navigates the field of view 218 using the sample stage 208 along vector t which is thus positioned at the region of interest 600.

In step S7, the microscope 210, i.e. the X-ray source 212 and the X-ray detector 214, take an image of the region of interest 600 which can then be processed further for failure analysis.

Then, the gripper 206 removes the second sample 200 from the microscope 210 and places it back onto the conveyor 204 at the position P. Instead of the conveyor 204, a magazine or the like can be used.

Steps S5 to S7 can be repeated for as many consecutive samples 200 which are to be analyzed for possible failures at the respective regions of interest 600.

Although the present disclosure has been described in accordance with certain embodiments, it is obvious for the person skilled in the art that modifications are possible in all embodiments.

What is claimed is:

1. A method, comprising:
   registering a position of a sample, comprising:
   using a tomographic X-ray microscope to image a first portion of a sample which comprises a first feature;
   identifying the first feature by matching the first feature to a pre-recorded first feature;
   determining a relative position of the first feature in relation to the pre-recorded first feature;
   using the tomographic X-ray microscope to image a second portion of the sample which comprises a second feature;
   identifying the second feature by matching the second feature to a pre-recorded second feature; and
   determining a relative position of the second feature in relation to the pre-recorded second feature,
   determining a registered position of the sample based on the relative position of the first feature and/or the relative position of the second feature;
   navigating a field of view of the tomographic X-ray microscope over a region of interest based on the registered position of the sample; and
   using the tomographic X-ray microscope to image the region of interest,
   wherein the sample is rotated between imaging the first and second portions by a predetermined angle, and the first and second portions lie in planes intersecting each other.

2. The method of claim 1, further comprising using a scoring method to select the pre-recorded first feature from a plurality of features of a portion of a first sample.

3. The method of claim 1, wherein the pre-recorded first feature is selected from a portion of a first sample, and registering, navigating and imaging are performed for a plurality of samples.

4. The method of claim 1, wherein the tomographic X-ray microscope comprises an X-ray source, a sample stage including the sample, and an X-ray detector.

5. The method of claim 1, further comprising:
   using the tomographic X-ray microscope to image the first portion at a first resolution;
   using the tomographic X-ray microscope to image a sub-portion of the first portion at a second resolution, wherein the first resolution is lower than the second resolution.

6. The method of claim 1, wherein the sample comprises an integrated circuit package.

7. The method of claim 1, further comprising:
   before registering, navigating and imaging, retrieving the sample from a conveyer, and placing the sample in the tomographic X-ray microscope; and
   after registering, navigating and imaging, removing the sample from the tomographic X-ray microscope, and placing the sample onto the conveyer.

8. One or more machine-readable hardware storage devices comprising instructions that are executable by one or more processing devices to perform operations comprising the method of claim 1.

9. A system comprising:
   one or more processing devices; and
   one or more machine-readable hardware storage devices comprising instructions that are executable by the one or more processing devices to perform operations comprising the method of claim 1.

10. The method of claim 1, comprising determining a registered position of the sample based on the relative position of the first feature and the relative position of the second feature.

11. The system of claim 9, further comprising a tomographic X-ray microscope.

12. The method of claim 2, wherein the scoring method comprises comparing, among the plurality of features, each feature to a respective other feature.

13. The method of claim 2, wherein selecting the pre-recorded first feature from the plurality of features comprises displaying to an operator at least two or more features from the plurality of features exceeding a score threshold.

14. The method of claim 13, further comprising allowing the operator to select one of the at least two or more features as the pre-recorded first feature.

15. The method of claim 4, wherein, in relation to the X-ray source, the X-ray detector is behind the sample.

16. The method of claim 4, wherein the sample stage comprises a sample holder that holds the sample.

17. A tomographic X-ray microscope, comprising:
   an imaging unit configured to: i) image a first portion of a sample which comprises a first feature; ii) image a second portion of the sample which comprises a second feature;
   and iii) image a region of interest of the sample;
   a registering unit configured to register a position of the sample, the registering unit comprising:
      an identifying unit configured to identify: i) the first feature by matching the first feature to a pre-recorded first feature; and ii) the second feature by matching the second feature to a pre-recorded second feature; and
      a determining unit configured to:
         i) determine a relative position of the first feature in relation to the pre-recorded first feature;
         ii) determine a relative position of the second feature in relation to the pre-recorded second feature; and
         iii) register the position of the sample based on the relative position of the first feature and/or the relative position of the second feature; and
   a navigating unit configured to navigate a field of view of the tomographic X-ray microscope over the region of interest based on the registered position of the sample.

18. The tomographic X-ray microscope of claim 17, further comprising a device configured to rotate the sample.

19. A system comprising:
   the tomographic X-ray microscope of claim 17;
   a first device configured to provide a plurality of samples; and
   a second device configured to load at least one sample of the plurality of samples into the tomographic X-ray microscope.

20. The system of claim 17, wherein at least one unit selected from the group consisting of the registering unit, the identifying unit and the determining unit is configured to be at least partially implemented by hardware and/or software.

21. The system of claim 17, wherein at least one of the following holds:
   the imaging unit comprises an X-ray source and an X-ray detector; and
   the navigating unit comprises a sample stage comprising motors and a controller.

22. The system of claim 17, wherein the determining unit is configured to register the position of the sample based on the relative position of the first feature and/or the relative position of the second feature.

23. The system of claim 20, wherein at least one of the following holds:
   the imaging unit comprises an X-ray source and an X-ray detector; and
   the navigating unit comprises a sample stage comprising motors and a controller.

* * * * *

UNITED STATES PATENT AND TRADEMARK OFFICE
CERTIFICATE OF CORRECTION

| | |
|---|---|
| PATENT NO. | : 12,056,894 B2 |
| APPLICATION NO. | : 17/470695 |
| DATED | : August 6, 2024 |
| INVENTOR(S) | : Thomas Anthony Case et al. |

It is certified that error appears in the above-identified patent and that said Letters Patent is hereby corrected as shown below:

In the Claims

Column 12, Line 12 Claim 20, delete "The system" insert -- The tomographic X-ray microscope --.

Column 12, Line 16 Claim 21, delete "The system" insert -- The tomographic X-ray microscope --.

Column 12, Line 22 Claim 22, delete "The system" insert -- The tomographic X-ray microscope --.

Column 12, Line 26 Claim 23, delete "The system" insert -- The tomographic X-ray microscope --.

Signed and Sealed this
First Day of October, 2024

Katherine Kelly Vidal
*Director of the United States Patent and Trademark Office*